No. 847,520. PATENTED MAR. 19, 1907.
E. H. SMYTHE & E. A. BURROWS.
CIRCUIT BREAKER.
APPLICATION FILED APR. 22, 1905.

6 SHEETS—SHEET 1

Witnesses:
Geo. C. Davison
Irving MacDonald

Inventors:
Edwin H. Smythe
Eastman A. Burrows
By Barton James
Attys.

No. 847,520. PATENTED MAR. 19, 1907.
E. H. SMYTHE & E. A. BURROWS.
CIRCUIT BREAKER.
APPLICATION FILED APR. 22, 1905.

6 SHEETS—SHEET 3.

Witnesses:
Geo. C. Davison.
Irving MacDonald.

Inventors:
Edwin H. Smythe,
Eastman A. Burrows,
By Barton Tanner
Att'ys.

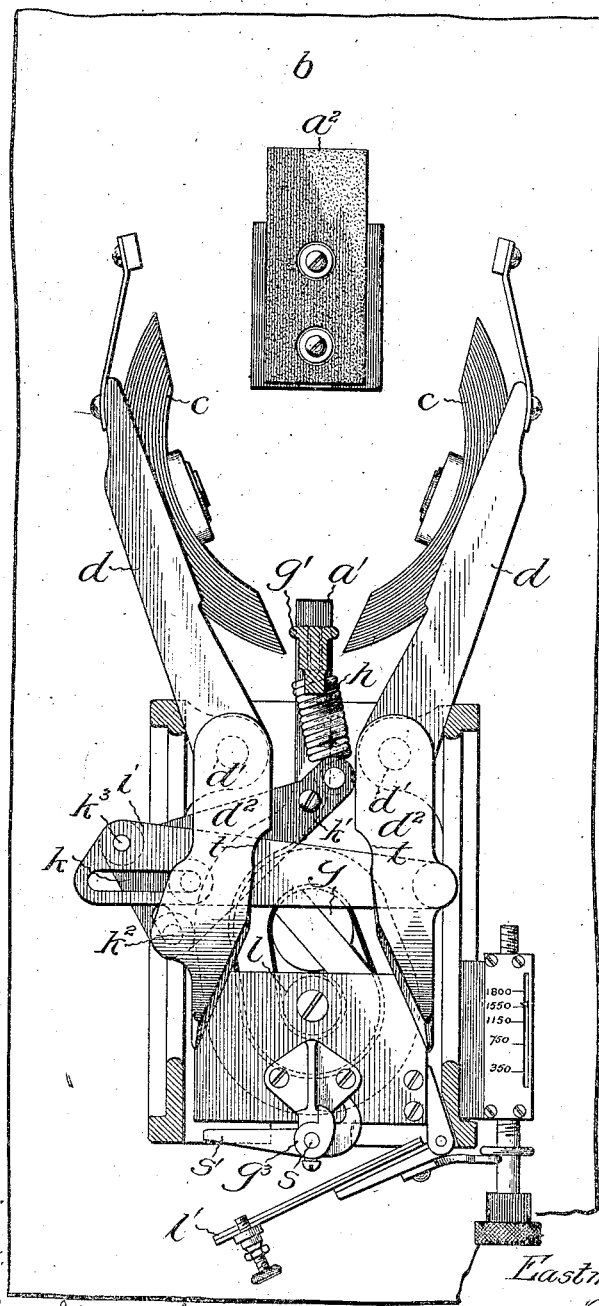

No. 847,520. PATENTED MAR. 19, 1907.
E. H. SMYTHE & E. A. BURROWS.
CIRCUIT BREAKER.
APPLICATION FILED APR. 22, 1905.
6 SHEETS—SHEET 5.
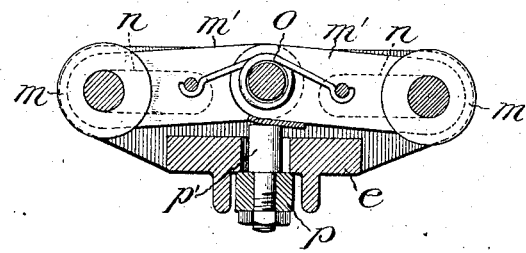
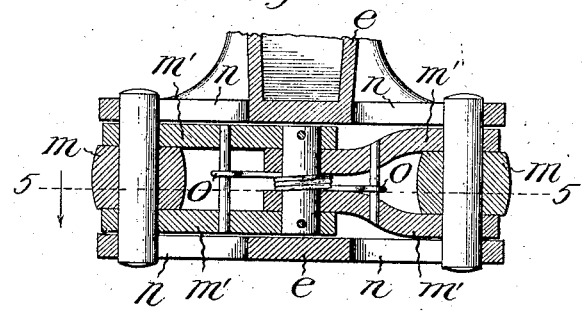
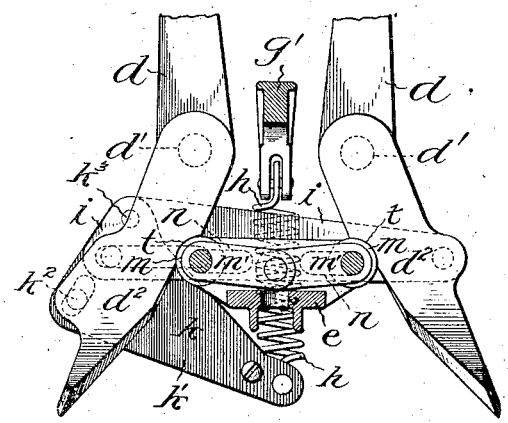
Witnesses:
Inventors:
Edwin H. Smythe,
Eastman A. Burrows,
By Barton Tanner
Attys.

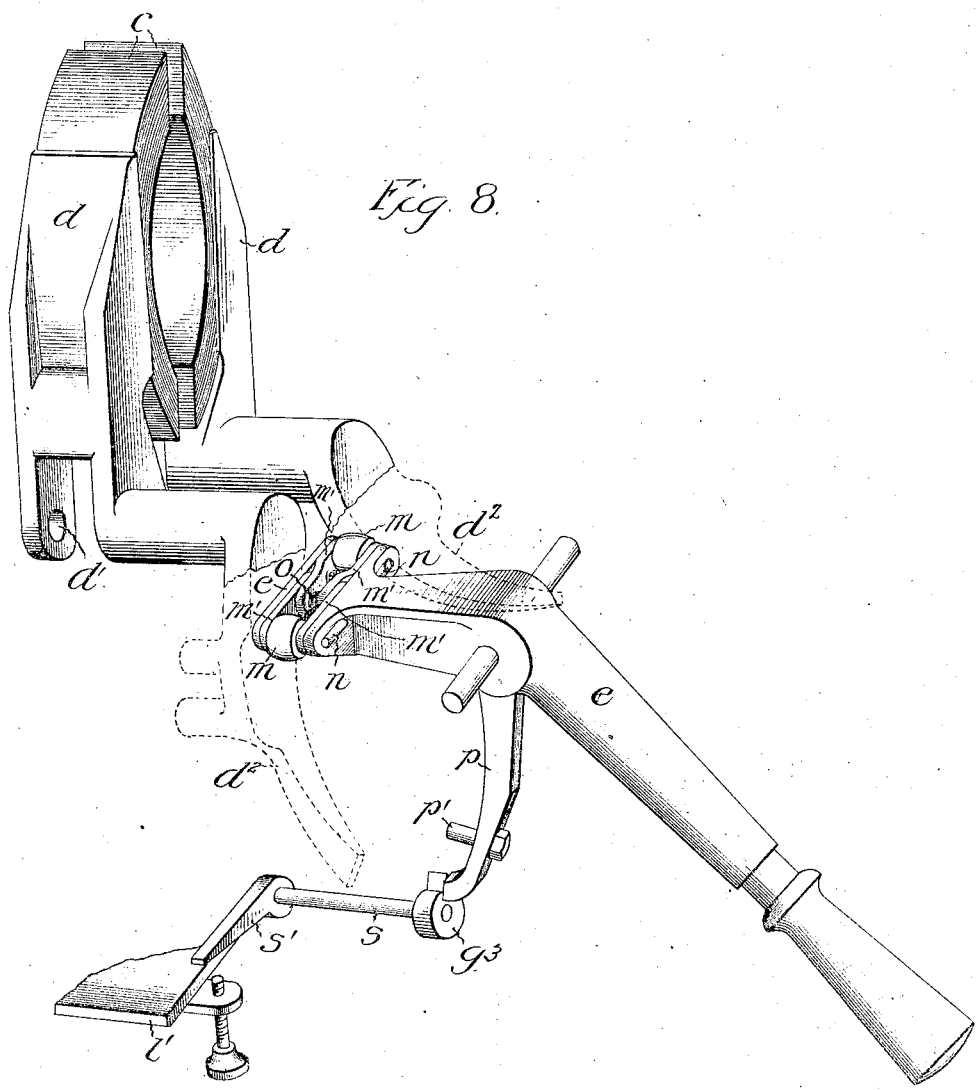

UNITED STATES PATENT OFFICE.

EDWIN H. SMYTHE AND EASTMAN A. BURROWS, OF CHICAGO, ILLINOIS, ASSIGNORS TO WESTERN ELECTRIC COMPANY, OF CHICAGO, ILLINOIS, A CORPORATION OF ILLINOIS.

CIRCUIT-BREAKER.

No. 847,520.        Specification of Letters Patent.        Patented March 19, 1907.

Application filed April 22, 1905. Serial No. 256,861.

*To all whom it may concern:*

Be it known that we, EDWIN H. SMYTHE and EASTMAN A. BURROWS, citizens of the United States, residing at Chicago, in the county of Cook and State of Illinois, have invented a certain new and useful Improvement in Circuit-Breakers, of which the following is a full, clear, concise, and exact description.

Our invention relates to a circuit-breaker; and its object is to provide an improved device which will have large capacity in proportion to the space required upon the face of the switchboard, will require only slight energy to trip the switch, and so will be sensitive to release by any desired strength of current within wide limits, will subject the switchboard-panel to the minimum jar, and will provide for the release of the switch in any position of the setting-handle, so that the switch may be automatically opened even during the movement of the setting-handle in the attempt to close it if there should be a short circuit or overload on the system.

Our invention comprises a number of novel features of construction, which can be best explained by reference to the specific structure embodying them illustrated in the accompanying drawings.

Figure 1:
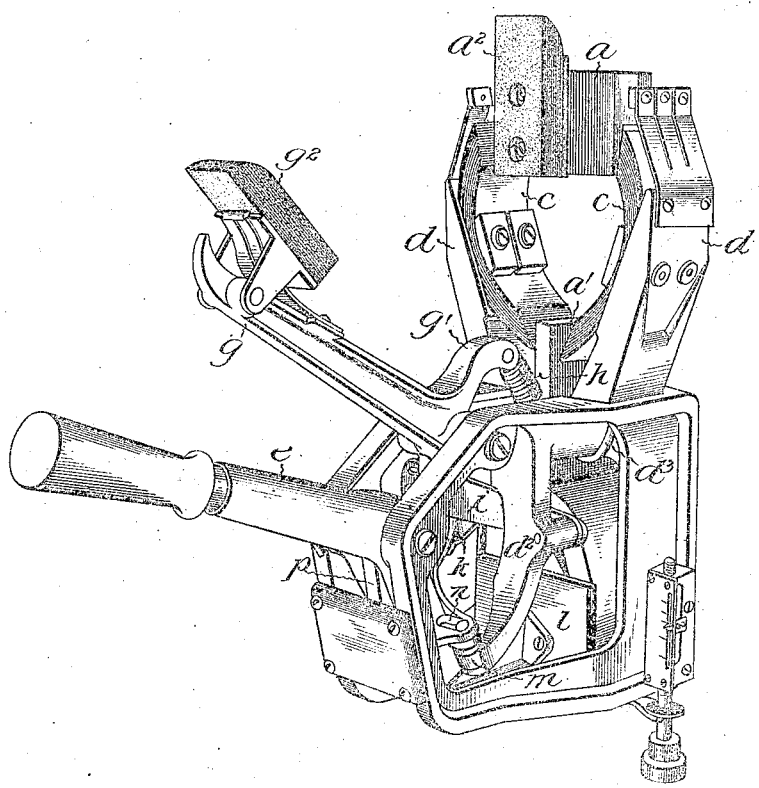
Figure 2:
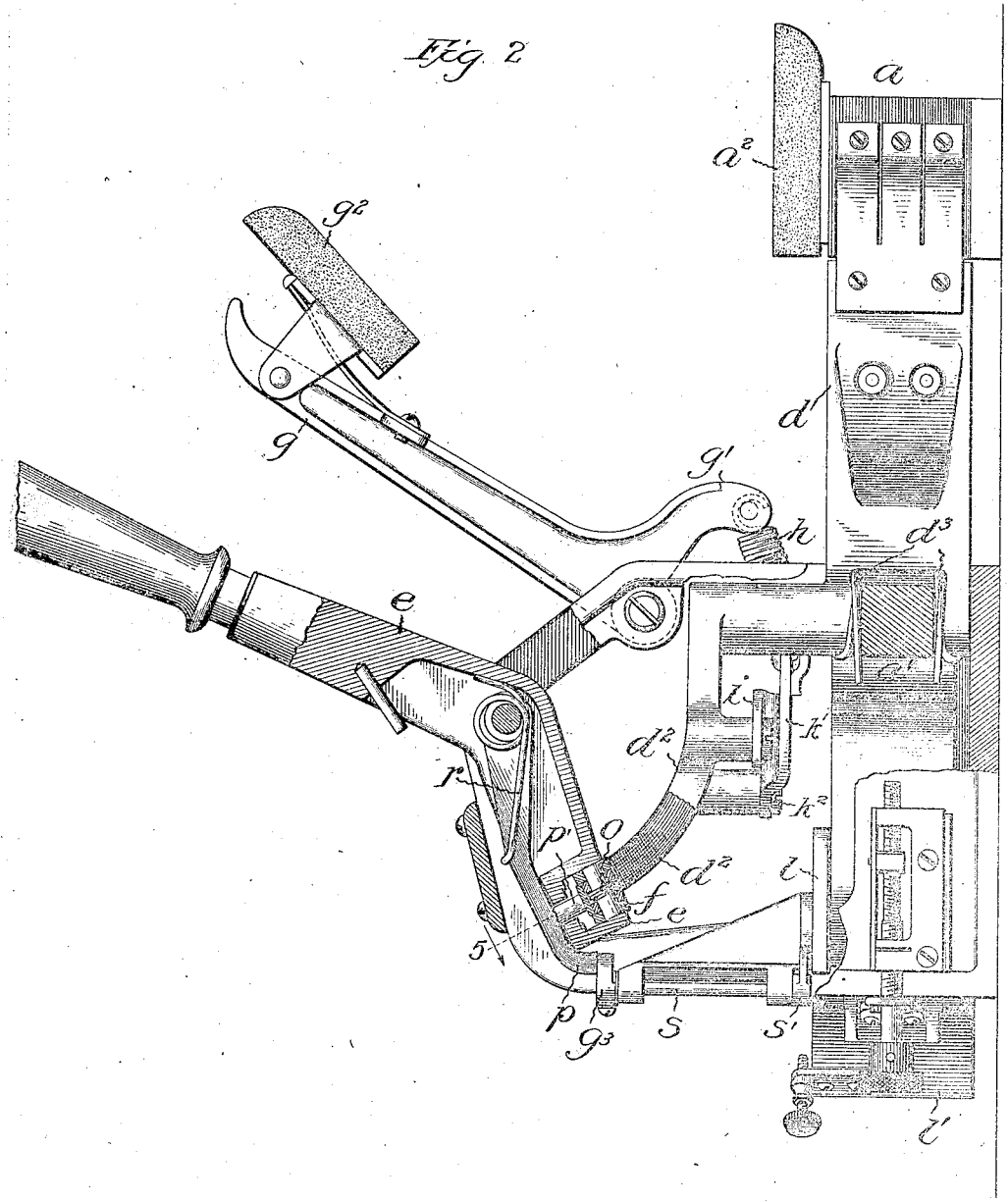
Figure 3:
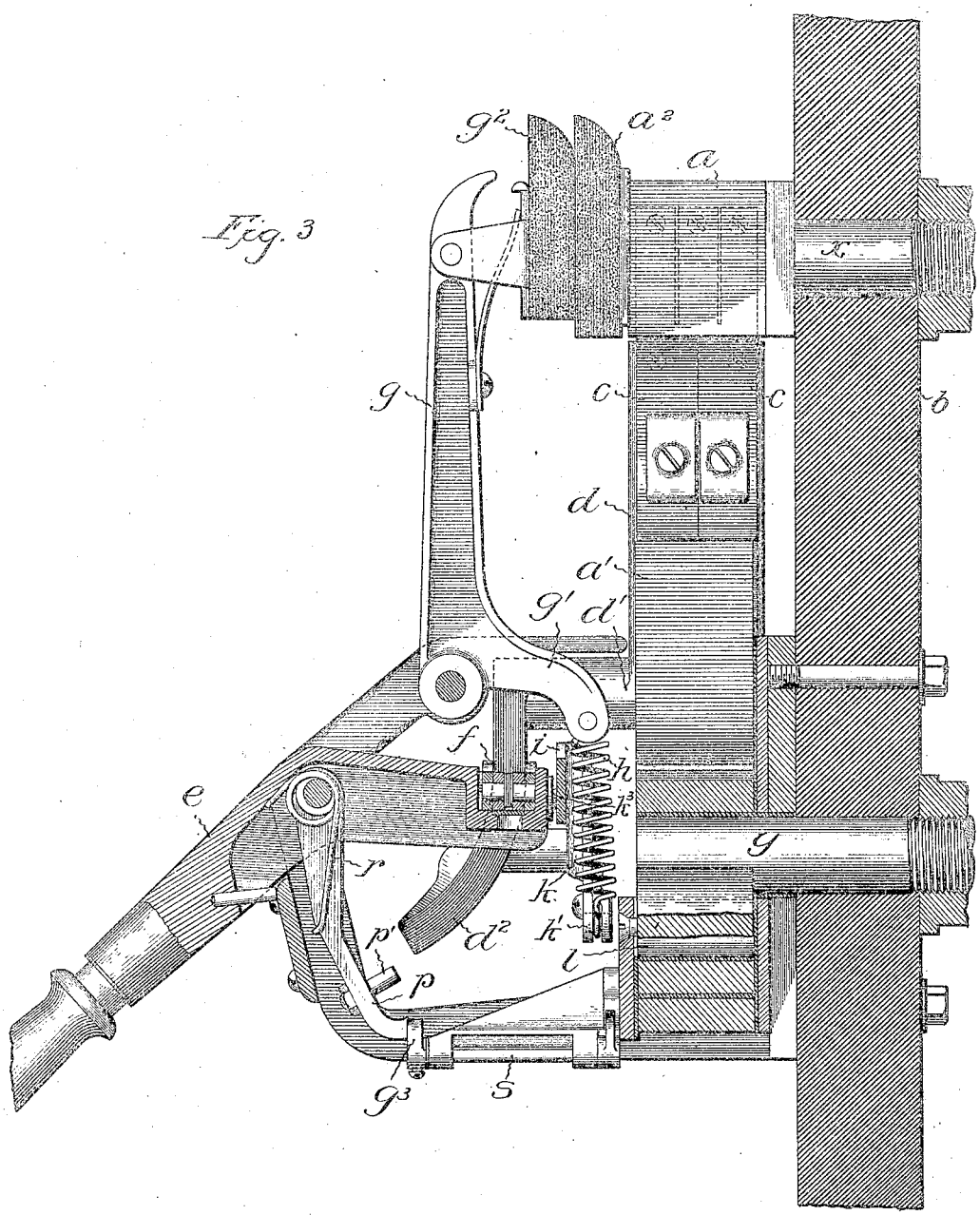

Figure 1 is a perspective view of our improved circuit-breaker. Fig. 2 is a sectional side view thereof, showing the parts in the positions they would occupy with the switch open. Fig. 3 is a similar view, the switch being closed. Fig. 4 is a front sectional view with the operating-handle removed. Figs. 5 and 6 are detail views illustrating the collapsible toggle-wedge connected by the operating-lever. Fig. 7 is a detail view illustrating the manner in which the lever extensions of the switch-arm are wedged apart by the collapsible toggle to hold the switch closed. Fig. 8 is a skeleton view, somewhat diagrammatic in character, illustrating the tripping mechanism.

The same letters of reference indicate the same parts wherever they are shown.

In the circuit-breaker shown the copper contact-terminals $a$ $a'$ project edgewise from the base $b$ and are adapted to be spanned by the laminated copper bridging members $c$ $c$, engaging both sides of said terminals. Said bridging members are carried by and form parts of the main-switch arms $d$ $d$, which are pivoted at $d'$ $d'$ to move reciprocally. Said switch-arms are provided with curved diverging cam-lever extensions $d^2$ $d^2$, which are adapted to be wedged apart by a collapsible toggle $f$, forced between them by means of a manual operating-lever $e$, upon which said toggle $f$ is carried. Said cam-lever extensions $d^2$ $d^2$ when thus forced apart rock the main-switch levers $d$ $d$ upon their pivots $d'$ $d'$, and so cause the bridging members $c$ $c$ of the switch to be pressed tightly against the sides of said contact-terminals $a$ $a'$, whereby the latter are electrically united.

It will be observed that both sides of each terminal are utilized for contact-surfaces instead of only one side or face, a considerable increase in capacity being thus secured. We also prefer to mount a carbon "shunt-contact" $a^2$ on the front edge of the contact-terminal $a$. This carbon face $a^2$ is adapted to be engaged by the carbon face $g^2$ of a third or auxiliary-switch lever $g$, which is pivoted to swing in a plane at right angles to the face of the board and at right angles to the plane of movement of the main-switch levers. This auxiliary switch, having carbon contacts, is in shunt of the main switch and is adjusted to be opened slightly after the main-switch levers have left the contact $a$, so as to take the arc which tends to form upon the breaking of the circuit. This auxiliary-switch lever is arranged to be operated in the movement of the manual operating-lever $e$; but instead of being directly connected therewith it is preferably connected with the main levers by a multiplying system of levers. As shown, the extension $g'$ of the auxiliary-switch arm $g$ is connected, through a coiled extension-spring $h$, with the longer arm $k'$ of a bell-crank lever $k$. The fulcrum $k^3$ of said bell-crank lever is upon one end of a link $i$, connecting the same to one of the cam-lever extensions $d^2$ of the main-switch, while the other arm $k^2$ of said bell-crank is pivoted directly to the other main-switch extension-arm $d^2$. The result of this construction is that when the two main-switch levers $d^2$ $d^2$ move reciprocally away from each other both the arm $k^2$ and the fulcrum $k^3$ of the bell-crank are moved in opposite directions to give increased movement to the longer arm $k'$, which is transmitted, through the stiff spring $h$, to the arm $g$. The spring $h$ forms a yielding connection with the switch-arm and is desirable, because in closing the switch the carbon contact $g^2$ must come to rest against the block $a^2$ before the main-switch bridging members are completely closed, and when the switch opens the bridging members must leave the terminal $a$ before the auxiliary-switch contact $g^2$, which is to take the arc, has separated from the carbon block $a^2$.

As shown, the lower copper contact-terminal $a'$ of the main switch is preferably formed by the projecting end of the copper bar which is wound spirally around the tripping-magnet core $l$ and forms the magnetizing-helix thereof. The inner end of the spirally-wound copper bar or helix is joined to a central copper post $y$, which passes back through the base-frame $b$ and forms one of the connection-terminals of the apparatus, the other connection-terminal being formed by a post $x$, passing back through the base from the upper contact-terminal $a$. The magnetizing-helix of the tripping-magnet $l$ is thus in series with the switch to respond to current through the same.

We will now proceed to describe the mechanism whereby the switch is automatically opened upon the passage of excessive current through the tripping-magnet $l$. In the first place it is understood, of course, that the switch-arms $d$ $d$ are provided with strong springs $d^3$ $d^3$, which are arranged to oppose the closing movement of said switch-arms and to force said arms away from the contacts $a$ $a'$ when said arms are free to move.

The operating-handle $e$ carries upon its inner end a collapsible toggle mechanism $f$, which is adapted to be wedged between the curved diverging cam-lever extensions $d^2$ $d^2$, extending downwardly from the pivotal axes $d'$ $d'$ of the main-switch arms, whereby said extensions are forced apart and cause the upper ends $d$ $d$ of the switch-arms to close toward the contact-terminals $a$ $a'$. Said toggle mechanism is illustrated in detail in Figs. 5, 6, and 7 and comprises cam-rollers $m$ $m$, adapted to engage the inner edges or divergent cam-surfaces of said lever extensions $d^2$ $d^2$ and toggle-links $m'$ $m'$, pivoted together centrally and supporting said rollers $m$ $m$ upon their outer ends. The axles of said rollers are arranged to slide in slots $n$ $n$, running crosswise at the end of the frame of the operating-lever $e$. When the toggle-links $m'$ $m'$ are permitted to buckle together or turn upon their central knuckle-joint, the cam-rollers $m$ $m$ may thus move toward each other across the end of the operating-lever, so as to exert no wedging pressure upon the lever extensions $d^2$ $d^2$. Normally, however, the links of said toggle are held by a spring $o$ in the position shown in Fig. 7, with the knuckle-joint moved beyond the center on the side toward the frame of the lever, so that increased pressure upon the cam-rollers $m$ $m$ only braces said toggle more firmly against the frame. To collapse said toggle, the central joint thereof must be forced past the dead-center in the other direction, and this may be accomplished by means of the spring-actuated collapsing-hammer $p$. Said hammer has a projecting lug $p'$ upon its end, which is adapted to pass through a hole in the frame which supports the toggle to strike said toggle and move the same past the dead-center, so that said toggle will be collapsed by the pressure upon the rollers $m$ $m$. Fig. 5 shows the end $p'$ of the hammer in the act of engaging the toggle and forcing the joint thereof outward in position to collapse.

The hammer $p$ is preferably pivoted concentrically with the operating-handle $e$ and is adapted to be normally held under restraint by the electromagnetically-controlled latch $q^3$. When released, the hammer swings around in the path of the toggle until it strikes and collapses it in whatever position it may be. It will be noted that when the operating-lever $e$ is rocked to close the switch the hammer $p$ is held by the latch $q^3$, and as the lever continues its motion the spring $r$, acting upon said hammer and which is connected to the lever $e$, is put under increasing tension, storing up energy sufficient to collapse the toggle when said hammer shall be released. As the toggle is wedged more tightly between the switch-lever arms $d^2$ $d^2$ the force necessary to collapse said toggle will of course be increased, and increasing tension is therefore placed upon the hammer as the operating-lever $e$ continues in its movement, the spring being connected with said lever $e$ to be tightened in the closing movement thereof. The latch $q^3$ is shown as mounted upon a rock-shaft $s$, which is provided with a trigger $s'$, adapted to be engaged by an adjustable finger carried by the swinging armature $l'$ of the tripping-magnet $l$. Said armature is pivoted or hinged horizontally to swing below the pole-pieces of the magnet $l$ and when unattracted falls away from said pole-pieces to the limit determined by an adjustable stop, which is adapted to engage a rearward extension of said armature. It will be observed that only slight energy is required for tripping the switch, it being necessary only to move the catch which releases the hammer $p$, the spring which actuates said hammer furnishing the force necessary to collapse the toggle-wedge $f$.

The operation of the device is as follows: To close the switch, the operating-handle $e$ is moved from the position shown in Figs. 1 and 2 to the position shown in Fig. 3. This forces the cam-rollers $m$ $m$ of the collapsible toggle-wedge $f$ upwardly between the diverging cam-lever arms $d^2$ $d^2$ until finally said cam-rollers come to rest in slight recesses $t$ $t$ in the faces of said lever-arms, the switch bridging members c c being thereby held tightly closed against the sides of the contact-terminals a a'. If during the closing movement of the switch or at any time while it is closed excessive current should pass through the magnet-helix sufficient to draw the armature l' and rock the shaft s carrying the latch g, the hammer p will be released to trip the switch. This will be accomplished by the hammer striking the toggle-links m' m' and throwing the joint thereof past the dead-center, so that the toggle will collapse under the pressure of the switch-arms and allow the said arms to fly open.

It will be understood that our invention is capable of many modifications and that certain constructional features herein disclosed may be adopted in circuit-breakers differing otherwise from the one shown. We do not, therefore, desire to be understood as limiting ourselves to the precise construction shown; but

We claim—

1. In a circuit-breaker, the combination with a pair of levers pivoted intermediate their ends, of a switch-arm carried by each lever, contact-terminals adapted to be closed by said switch-arms, an operating-lever pivoted to swing in a plane perpendicular to the plane of movement of said pair of levers and a toggle actuated by said operating-lever and adapted to be wedged between the ends of said pair of levers to swing said switch-arms toward each other into engagement with the opposite faces of said contact-terminals.

2. In a circuit-breaker, the combination with a pair of switch-arms having lever extensions, of an operating-lever pivoted to swing in a plane perpendicular to the plane of movement of said switch-arms; a collapsible toggle actuated by said operating-lever and adapted to be wedged between said extensions to operate said switch-arms, a hammer for collapsing said toggle, and electromagnetic means for controlling the operation of said hammer.

3. In a circuit-breaker, the combination with a switch, of a collapsible toggle for holding said switch closed, an operating-lever for moving said toggle to close the switch, a spring-actuated hammer for collapsing said toggle, set in the movement of said operating-lever, and electromagnetic mechanism for tripping or releasing said hammer.

4. In a circuit-breaker, the combination with the base, of a pair of switch-arms having pivots about which said arms swing substantially parallel to said base, and an operating-lever pivoted to swing in a plane at an angle to the plane of said base, said lever being provided with means for actuating said switch-arms.

5. In a switch, the combination with a base and a contact-terminal projecting therefrom, of a pair of switch-arms adapted to engage opposite sides of said terminal, and a third switch-arm adapted to engage the face of said terminal.

6. In a circuit-breaker, the combination with a pair of contact-terminals, of bridging switch members adapted to engage the sides of said terminals to unite them, a carbon face for the outer face of one of said terminals, a third switch member arranged to operate in a plane at an angle to said bridging members and having a carbon face adapted to engage the said carbon face of said terminal, and a manual lever connected to all of said switch members to operate the same.

7. A circuit-breaker having a base, a copper switch-terminal projecting outwardly from said base, a pair of switch-arms adapted to engage the opposite sides of said terminal, a carbon face for the top of said terminal and a shunt switch-lever engaging said carbon face to take the arc.

8. In a switch, the combination with a pair of opposing levers pivoted intermediate their ends, of a pair of switch-arms oppositely mounted upon said levers, contact-terminals each adapted to have its opposite face engaged by said switch-arms, and a wedging member adapted to be inserted between the free ends of said levers to force the same apart and thereby to swing said switch-arms into engagement with the opposite faces of said contact-terminals.

9. In a circuit-breaker, the combination with a base, of contact-terminals projecting edgewise from said base, laminated bridging members adapted to span said contact-terminals on both sides thereof, said bridging members being fulcrumed to swing in a plane parallel with the plane of the base and a switch-arm adapted to engage the face of one of said terminals.

10. In a circuit-breaker, the combination with a movable switch member, a pivoted manual operating-lever, a collapsible connection between said operating-lever and said switch member, a spring-actuated collapsing hammer, a detent controlling the release of said hammer, and an electromagnet responsive to excessive current, having an armature adapted to move said detent to release the hammer, substantially as set forth.

11. In a circuit-breaker, the combination with a pair of opposed switch members, of a pivoted manual operating-lever carrying a collapsible toggle adapted to be wedged between said switch members to actuate the same, a spring-actuated hammer pivoted substantially concentric with said operating-lever and adapted when released to strike said toggle and collapse the same, independent of the position of said switch-arm, and electromagnetic tripping mechanism for said hammer.

12. In a circuit-breaker, the combination with two main-switch levers arranged to move reciprocally toward and from each other, of an auxiliary-switch lever, a bell-crank lever having its arms connected respectively to said auxiliary-switch lever and one of said main-switch levers, the fulcrum of said bell-crank being connected to the other main-switch lever; whereby in the movement of said main-switch levers a magnified movement is imparted to said auxiliary-switch lever.

13. In a circuit-breaker, the combination with a pair of reciprocally-acting main-switch levers, of an auxiliary-switch lever pivoted to swing in a plane at an angle to said main-switch levers, a pivoted manual operating-lever carrying a part adapted to engage said main-switch levers to actuate the same, and a magnifying-movement connection between one of said main-switch levers and said auxiliary-switch lever; whereby said auxiliary switch is actuated indirectly in the movement of said manual lever.

14. In a circuit-breaker, the combination with a switch-lever, of a pivoted manual operating-lever carrying at its end a collapsible member adapted to engage said switch-lever to actuate the same, a hammer pivoted concentrically with said operating-lever and arranged to swing in the arc or path of said collapsible member, an electromagnetically-controlled detent adapted to hold said hammer from following said collapsible member, and a spring arranged to actuate said hammer connected with said operating-lever to be put under increasing tension as the switch is closed.

15. In a circuit-breaker, the combination with a pair of pivoted switch-arms having diverging cam-lever extensions, of a pivoted operating-lever swinging in a plane at an angle to said switch-arms, said cam-lever extensions being curved concentric with the pivot of said operating-lever, cam-rollers mounted in the plane of said operating-lever in position to engage said cam-lever extensions to move the same, said cam-rollers being mounted to move crosswise in the frame of said operating-lever, means for holding said cam-rollers against such crosswise movement, and electromagnetic means for releasing said cam-rollers.

16. In an electric switch, the combination with a contact-terminal, of a pair of switch-arms, and a toggle-lever for forcing said switch-arms into engagement with the opposite faces of said terminal.

17. In an electric switch, the combination with a contact-terminal, of a pair of switch-arms, a collapsible toggle for forcing said switch-arms into engagement with the opposite faces of said terminal, and electromagnetically-operated means for operating said toggle to open said switch.

18. In a circuit-breaker, the combination with contact-terminals, of a pair of pivoted switch-arms adapted to bridge said terminals, a manual operating-lever, a collapsible toggle carried by said operating-lever, and adapted to be wedged thereby between said switch-arms to force the same into engagement with the opposite faces of said terminals, and automatically-operated electromagnetic means for collapsing said toggle.

19. In a circuit-breaker, the combination with the base, of a pair of switch-arms, having pivots about which said arms swing substantially parallel to said base, an operating-lever pivoted to swing at an angle to the plane of said base, and a toggle carried on the end of said lever, the ends of said toggle being arranged to be brought into engagement with said switch-arms to operate the same.

20. In a circuit-breaker, the combination with a base, of two main contact-terminals one vertically above the other projecting edgewise from the base, two laminated bridging members fulcrumed to swing in a plane parallel with the base, said bridging members being arranged to engage opposite faces of said main contact-terminals, an auxiliary-switch arm, a shunt-contact carbon carried on the end of said arm, a coöperating shunt-carbon secured to the edge of the upper contact-terminal, downward extensions of the said main bridging members, an operating-handle fulcrumed to swing at right angles to the plane of the base, a collapsible toggle carried on the end of said operating-handle and adapted to be wedged between the downward extensions of the said main bridging members to close the same against their contact-terminals, a movement-multiplying connection between said bridging members and the aforesaid auxiliary-switch arm, a spring-actuated hammer fulcrumed concentrically with the operating-handle and adapted to collapse said toggle, a latch normally restraining said hammer from following said toggle as the operating-handle is moved to close the switch, a tripping-magnet having an armature arranged to move said latch and release said hammer, and an energizing-winding for said magnet consisting of a copper bar coiled about the core of said magnet, the said lower contact-terminal of the device being formed by the projecting end of said copper bar.

In witness whereof we hereunto subscribe our names this 2d day of March, A. D. 1905.

EDWIN H. SMYTHE.
EASTMAN A. BURROWS.

Witnesses:
GEORGE P. BARTON,
IRVING MACDONALD.